United States Patent
Baker (10) Patent No.: US 11,186,139 B2
(45) Date of Patent: Nov. 30, 2021

(54) METHOD AND APPARATUS FOR CONTROLLING A VEHICLE CLIMATE SYSTEM

(71) Applicant: JAGUAR LAND ROVER LIMITED, Coventry (GB)

(72) Inventor: Roger Baker, Solihull (GB)

(73) Assignee: JAGUAR LAND ROVER LIMITED, Coventry (GB)

( * ) Notice: Subject to any disclaimer, the term of this patent is extended or adjusted under 35 U.S.C. 154(b) by 311 days.

(21) Appl. No.: 15/735,600

(22) PCT Filed: Jun. 10, 2016

(86) PCT No.: PCT/EP2016/063403
§ 371 (c)(1),
(2) Date: Dec. 11, 2017

(87) PCT Pub. No.: WO2016/198675
PCT Pub. Date: Dec. 15, 2016

(65) Prior Publication Data
US 2018/0312031 A1    Nov. 1, 2018

(30) Foreign Application Priority Data

Jun. 12, 2015 (GB) ..................................... 1510275

(51) Int. Cl.
B60H 1/00 (2006.01)
(52) U.S. Cl.
CPC ..... B60H 1/00742 (2013.01); B60H 1/00807 (2013.01); B60H 1/00878 (2013.01); B60H 2001/00733 (2019.05)

(58) Field of Classification Search
CPC ...... B60H 1/00742; B60H 2001/00185; B60H 2001/00733
See application file for complete search history.

(56) References Cited

U.S. PATENT DOCUMENTS

| 4,462,218 A | 7/1984 | Yamanaka |
| 6,454,178 B1 | 9/2002 | Fusco et al. |

(Continued)

OTHER PUBLICATIONS

Combined Search and Examination Report for application No. GB1510275.9, dated Oct. 22, 2015, 6 pages.

(Continued)

*Primary Examiner* — Rachid Bendidi
(74) *Attorney, Agent, or Firm* — Reising Ethington P.C.

(57) ABSTRACT

A method of controlling a vehicle climate system having a plurality of zones, wherein the plurality of zones includes a primary zone for a driver of the vehicle and one or more secondary zones for one or more passengers of the vehicle, the method including determining whether one or more of the plurality of zones is occupied by a person, receiving data indicative of a target temperature of each of the occupied zones, receiving data indicative of a target temperature in the primary zone, determining when one or more of the occupied zones becomes unoccupied, and adjusting the target temperature of one or more of the unoccupied zones to an adjusted target temperature. The adjusted target temperature is a function of the target temperature in the primary zone.

15 Claims, 4 Drawing Sheets

(56) References Cited

U.S. PATENT DOCUMENTS

| | | | | |
|---|---|---|---|---|
| 2007/0215339 A1* | 9/2007 | Kumada | ............ | B60H 1/00742 |
| | | | | 165/203 |
| 2011/0166747 A1 | 7/2011 | Wijaya et al. | | |
| 2014/0303835 A1* | 10/2014 | VerWoert | ........... | B60H 1/00742 |
| | | | | 701/36 |
| 2015/0073652 A1 | 3/2015 | Bennie et al. | | |

OTHER PUBLICATIONS

International Search Report for International application No. PCT/EP2016/063403, dated Sep. 30, 2016, 5 pages.
Written Opinion for International application No. PCT/EP2016/063403, dated Sep. 30, 2016, 5 pages.

\* cited by examiner

METHOD AND APPARATUS FOR CONTROLLING A VEHICLE CLIMATE SYSTEM

TECHNICAL FIELD

The present disclosure relates to a method and apparatus for controlling a vehicle climate system. Aspects of the invention relate to a method of controlling a vehicle climate system having a plurality of zones, to a control unit for controlling a vehicle climate system having a plurality of zones, to a climate system having a plurality of zones, and to a vehicle.

BACKGROUND

Known vehicle climate systems offer the ability to have different temperature settings in multiple zones of the vehicle. As an example, the driver of the vehicle may have the temperature of the driver zone set to 22° C., whereas the front passenger may have the temperature of the front passenger zone set to 20° C. Similarly, in certain vehicles, the rear passengers may have individually set temperatures for each of the respective rear passenger zones.

If one or more of the passengers leaves the vehicle, but the vehicle remains in a running condition, the temperatures set for each of the passenger zones remains as it was left by the previously present passenger. If these temperatures are significantly different to the temperature of the driver's zone, energy will be unnecessarily wasted and the temperature of the passenger zones may impact upon the temperature of the driver's zone.

Certain vehicles include a synchronize ("SYNC") function that, when activated, adjusts the temperatures of all passenger zones to match the temperature of the driver's zone. However, before manually activating the sync function, a driver must recognize that one or more of the passenger zone temperatures are different to the temperature of the driver's zone. This might frequently be missed by a driver, resulting in unnecessary energy wastage, particularly in respect of rear passenger zones whose settings may be out of view of the driver.

It is an aim of embodiments of the invention to at least mitigate one or more of the problems of the prior art.

SUMMARY OF THE INVENTION

Aspects and embodiments of the invention provide a method of controlling a vehicle climate system having a plurality of zones, a control unit for controlling a vehicle climate system having a plurality of zones, a climate system having a plurality of zones, and a vehicle.

According to an aspect of the invention, there is provided a method of controlling a vehicle climate system having a plurality of zones. The plurality of zones includes a primary zone for a driver of the vehicle and one or more secondary zones for one or more passengers of the vehicle. The method comprises determining whether one or more of the plurality of zones is occupied by a person, wherein said determining comprises determining if one or more of the secondary zones is occupied by a person. The method comprises receiving data indicative of a target temperature of one or more of the occupied zones and/or determining or estimating a target temperature of each of the occupied zones. The method comprises receiving data indicative of a target temperature in the primary zone. The method comprises determining when one or more of the occupied zones becomes unoccupied. The method comprises adjusting the target temperature of one or more of the unoccupied zones to an adjusted target temperature. The adjusted target temperature is a function of the target temperature in the primary zone, wherein the adjusted target temperature is either substantially equal to the target temperature in the primary zone plus or minus a predetermined constant or substantially equal to the target temperature in the primary zone multiplied by a predetermined factor.

The adjusted target temperature may be substantially equal to the target temperature in the primary zone.

The adjusted target temperature may be lower than the target temperature in the primary zone when the primary zone is being heated by the climate system.

The adjusted target temperature may be higher than the target temperature in the primary zone when the primary zone is being cooled by the climate system.

The adjusted target temperature may be dependent on a temperature outside of the vehicle.

Determining when one or more of the occupied zones becomes unoccupied may comprise using mechanical and/or electrical and/or optical means for detecting the presence of a person.

The method may comprise determining whether an auto-sync function has been activated, and only adjusting the target temperature of one or more of the unoccupied zones to the adjusted target temperature if the auto-sync function is activated.

According to another aspect of the invention, there is provided a control unit for controlling a vehicle climate system having a plurality of zones. The plurality of zones includes a primary zone for a driver of the vehicle and one or more secondary zones for one or more passengers of the vehicle. The control unit comprises means for receiving data indicative of the occupancy of one or more of the plurality of zones, wherein said means comprise means for receiving data indicative of the occupancy of one or more of the secondary zones. The control unit comprises means for receiving data indicative of a target temperature of one or more of the occupied zones. The control unit comprises means for receiving data indicative of a target temperature in the primary zone. The control unit comprises means for receiving data indicative of when one or more of the occupied zones becomes unoccupied. The control unit comprises means for providing instructions to adjust the target temperature of one or more of the unoccupied zones to an adjusted target temperature. The adjusted target temperature is a function of the target temperature in the primary zone, wherein the adjusted target temperature is either substantially equal to the target temperature in the primary zone plus or minus a predetermined constant or substantially equal to the target temperature in the primary zone multiplied by a predetermined factor.

The adjusted target temperature may be lower than the target temperature in the primary zone when the primary zone is being heated by the climate system.

The adjusted target temperature may be higher than the target temperature in the primary zone when the primary zone is being cooled by the climate system.

The adjusted target temperature may be dependent on a temperature outside of the vehicle.

The adjusted target temperature may be substantially equal to the target temperature in the primary zone.

The control unit may comprise means for receiving data indicative of whether or not an auto-sync function has been activated, wherein instructions to adjust the target temperature of one or more of the unoccupied zones to the adjusted target temperature are only provided if the auto-sync function is activated.

According to another aspect of the invention, there is provided a control unit for controlling a vehicle climate system having a plurality of zones as described above, wherein:

said means for receiving data indicative of the occupancy of one or more of the plurality of zones comprises an electronic processor having an electrical input for receiving said data indicative of the occupancy of one or more of the plurality of zones;

said means for receiving data indicative of a target temperature of each of the occupied zones comprises an electronic processor having an electrical input for receiving said data indicative of a target temperature of each of the occupied zones;

said means for receiving data indicative of when one or more of the occupied zones becomes unoccupied comprises an electronic processor having an electrical input for receiving said data indicative of when one or more of the occupied zones becomes unoccupied; and said means for providing instructions to adjust the target temperature of one or more of the unoccupied zones to an adjusted target temperature comprises an electronic processor having an electrical output for providing instructions to adjust the target temperature of one or more of the unoccupied zones to an adjusted target temperature.

Said means for receiving data indicative of the occupancy of one or more of the secondary zones comprises an electronic processor having an electrical input for receiving said data indicative of the occupancy of one or more of the secondary zones.

Said means for receiving data indicative of a target temperature in the primary zone comprises an electronic processor having an electrical input for receiving said data indicative of a target temperature in the primary zone.

Said means for receiving data indicative of whether or not an auto-sync function has been activated comprises an electronic processor having an electrical input for receiving said data indicative of whether or not an auto-sync function has been activated.

According to another aspect of the invention, there is provided a control unit for controlling a vehicle climate system having a plurality of zones as described above, wherein:

said means for receiving data indicative of a target temperature of each of the zones comprises an electronic processor having an electrical input for receiving said data indicative of a target temperature of each of the zones;

said means for receiving data indicative of when one or more of the zones becomes unoccupied comprises an electronic processor having an electrical input for receiving said data indicative of when one or more of the zones becomes unoccupied; and said means for providing instructions to adjust the target temperature of one or more of the unoccupied zones to an adjusted target temperature comprises an electronic processor having an electrical output for providing instructions to adjust the target temperature of one or more of the unoccupied zones to an adjusted target temperature.

According to another aspect of the invention, there is provided a vehicle climate system having a plurality of zones and including a control unit as described above.

According to another aspect of the invention, there is provided a vehicle including a vehicle climate system as described above.

According to another aspect of the invention, there is provided a vehicle including means to execute a method as described above.

Within the scope of this application it is expressly intended that the various aspects, embodiments, examples and alternatives set out in the preceding paragraphs, in the claims and/or in the following description and drawings, and in particular the individual features thereof, may be taken independently or in any combination. That is, all embodiments and/or features of any embodiment can be combined in any way and/or combination, unless such features are incompatible. The applicant reserves the right to change any originally filed claim or file any new claim accordingly, including the right to amend any originally filed claim to depend from and/or incorporate any feature of any other claim although not originally claimed in that manner.

BRIEF DESCRIPTION OF THE DRAWINGS

One or more embodiments of the invention will now be described by way of example only, with reference to the accompanying figures, in which.

DETAILED DESCRIPTION

Figure 1:
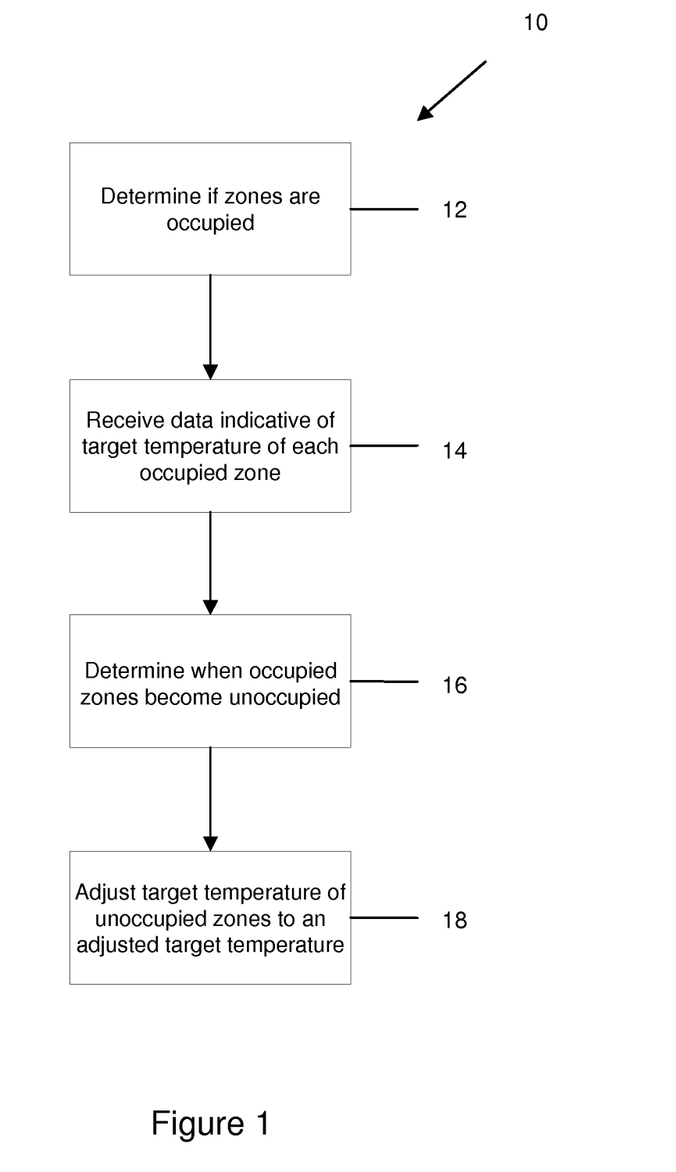
FIG. 1 shows a method according to an embodiment of the present invention.

FIG. 1 illustrates a method 10 of controlling a vehicle climate system having a plurality of zones according to an embodiment of the present invention. Each of the zones of the vehicle may have an independent target temperature setting that may be adjusted by an occupant of the respective zone.

The method 10 comprises the step 12 of determining if one or more of the plurality of zones is occupied by a person. This determination may be accomplished by any suitable direct or indirect means. For example, any one or more of suitable mechanical, electrical, or optical means may be utilized for detecting the presence of a person in a zone. Examples of suitable means for detecting the presence of a person in a zone include pressure sensors (e.g. in the seat pad), capacitive sensors, near field sensors, visual sensors such as cameras or other optical systems that may include a light emitter and a light receiver, where the presence of an occupant is detected when the emitted light fails to reach the receiver (i.e. if an occupant is in the optical path between the emitter and the receiver). Other known means for detecting the presence of a person in a zone are also useful.

At step 14, data that is indicative of a target temperature of each of the occupied zones (as determined by step 12) is received. The target temperature of each occupied zone is the temperature selected by the occupant of that respective zone. It will be appreciated that the actual temperature of each occupied zone may not be equal to the target temperature selected by the occupant of the zone at a given time. That is, an adjustment period is often required for the actual temperature to reach the desired target temperature.

Additionally, at step 16, a determination is made as to when one or more of the previously determined occupied zones becomes unoccupied. That is, once one or more zones are determined to be occupied by step 12, only those occupied zones are considered at step 16 which further determines if they subsequently become unoccupied. The determination made at step 16 may utilize the same means utilized to determine if the zones are occupied in step 12. Alternatively, different means may be used. As with step 12, any one or more of suitable mechanical, electrical, or optical means may be utilized for detecting the lack of presence of a person in a previously determined occupied zone. Examples of suitable means for detecting the lack of presence of a person in a zone include pressure sensors (e.g. in the seat pad), capacitive sensors, near field sensors, visual sensors such as cameras or other optical systems that may include a light emitter and a light receiver, where the lack of presence of an occupant is detected when the emitted light reaches the receiver. Additionally or alternatively, occupant presence may be determined in a zone by sensing means arranged to determine if a vehicle seat belt is in use, either by determination that a seat belt buckle is in a latched state and/or that the seat belt has been spooled out from a fully retracted condition.

Step 16 may be repeated one or more times with a time delay between each repetition to reduce any risk of a false determination that an occupant has left the zone (e.g. if the occupant moves within the zone but does not actually leave).

When one or more of the previously determined occupied zones are subsequently determined at step 16 to become unoccupied, the target temperature of the newly determined unoccupied zones (as by step 16) is adjusted at step 18 to an adjusted target temperature. In certain embodiments, the adjusted target temperature of the one or more newly unoccupied zones may be equal or closer to the target temperature of one of the other zones (a zone which the driver of the vehicle occupies) relative to the (unadjusted) target temperature of the respective newly unoccupied zones. The adjustment of step 18 may occur over a predetermined time period to avoid any abrupt changes in temperature and/or the operation of the climate system of the vehicle (e.g. which may lead to a large increase in noise from the climate system).

It will be appreciated that step 14 may be performed after step 16, where the data indicative of the target temperature of each occupied zone may comprise data relating to the target temperature of the newly unoccupied zone (i.e. prior to any subsequent adjustments being made). That is, the target temperature of a newly unoccupied zone will be the target temperature last set by the previous occupant of that zone.

Figure 2:
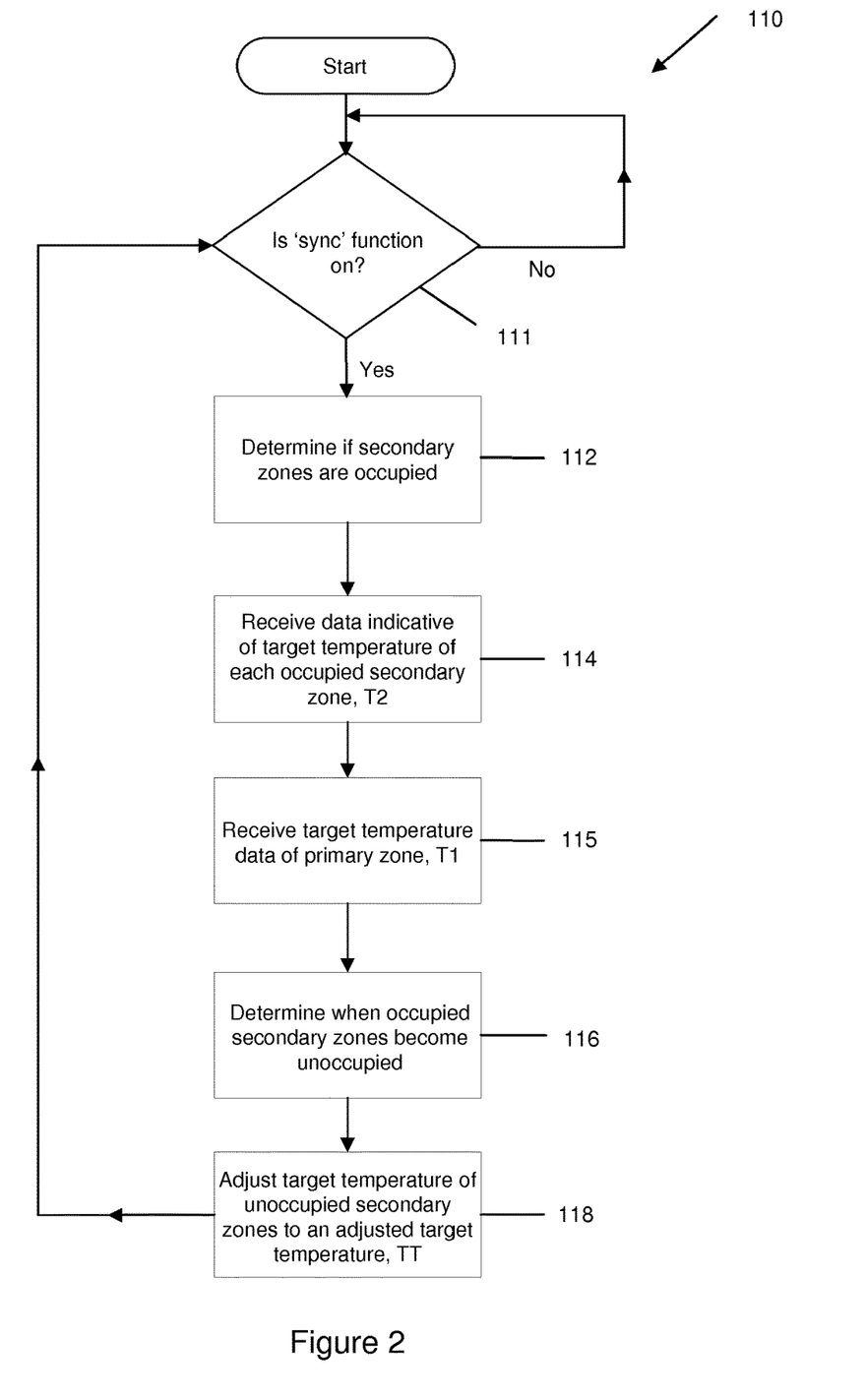
FIG. 2 shows a method according to an alternative embodiment of the present invention.

FIG. 2 illustrates a method 110 according to an alternative embodiment of the present invention. New features described below with reference to FIG. 2 (relative to the method 10 of FIG. 1) may be incorporated individually, independently or in any suitable combination into the method 10 described in relation to FIG. 1 in certain embodiments of the present invention. That is, the method 110 described below with reference to FIG. 2 illustrates several additional optional features of the present invention where certain embodiments of the invention may include any one or more of the additional features.

The method 110 of FIG. 2 incorporates a user actuated synchronization ("sync") function. A user (e.g. the driver of the vehicle) may actuate the sync function (i.e. turn the sync function on) to enable the automatic adjustment of temperatures of newly unoccupied zones. The sync function may be switched on and off by the user by pressing a button, for example. Zones which are unoccupied from the time when the vehicle is switched on may automatically "sync" (i.e. adjust). In certain embodiments, as is described further below, this adjustment may be in relation to the temperature of another of the zones (e.g. equal the target temperature of that zone), such as the zone of the driver of the vehicle.

Firstly, a determination is made at step 111 as to whether or not the sync function is on or not. If the sync function is determined to be off, the zones may continue to operate in their existing state (which may be independent of one another). If the sync function is determined to be on, a determination in relation to occupancy is performed at step 112.

In the method 110 of FIG. 2, a distinction is made between a primary zone of the vehicle and one or more secondary zones of the vehicle. In particular, the primary zone is the zone which may be occupied by the driver of the vehicle, and the one or more secondary zones are the zones which may each be occupied by a passenger of the vehicle. The determination made at step 112 is specifically in respect of the one or more secondary zones. That is, only the presence of passengers in the secondary zones is determined. Data indicative of a target temperature, T2, of each of the occupied secondary zones is received at step 114. Additionally, at step 115, data indicative of a target temperature, T1, of the primary (i.e. driver's) zone is received. A determination is made at step 116 as to whether or not one or more of the previously determined occupied secondary zones have become unoccupied.

The target temperature, T2, of each of the newly unoccupied secondary zones is then adjusted at step 118 to an adjusted target temperature, TT.

The adjusted target temperature, TT, may be a function of the target temperature, T1, of the primary zone, i.e. T2=TT=f(T1). In certain embodiments, TT=T1, such that the target temperature of each of the newly unoccupied secondary zones is adjusted to equal the target temperature of the primary (i.e. driver's) zone. In other embodiments, other functions may be employed. For example, in certain embodiments, TT=T1±X, where X is a predetermined constant. In certain embodiments, TT=T1·Y, where Y is a predetermined factor.

In alternative embodiments, the adjusted target temperature, TT, may not be a function of the target temperature, T1, of the primary zone, and may be alternatively determined. For example, the adjusted target temperature, TT, may be determined by an outside temperature of the vehicle or other parameters. The adjusted target temperature, TT, may be selected so as to achieve improved energy efficiency of the vehicle.

In certain embodiments, the adjusted target temperature, TT, may be selected depending on whether the sync function selected by the user is an "automatic-sync" ("AUTO-SYNC") function or an "economy-sync" ("ECO-SYNC") function. For example, if the auto-sync function is selected by the user (e.g. by pressing an "automatic-sync" or "AUTO-SYNC" button), the adjusted target temperature may be determined as TT=T1. As another example, if the eco-sync function is selected by the user (e.g. by pressing an "economy-sync" or "ECO-SYNC" button), the adjusted target temperature may be determined as TT=T1±X or TT=T1·Y or an outside temperature of the vehicle or other suitable parameters for achieving improved energy efficiency performance of the vehicle. Therefore, in certain embodiments, step 11 may determine whether one or both of the "auto-sync" and "eco-sync" functions are enabled (i.e. "on") and this will determine the nature of the target temperature, TT.

In certain embodiments, if a newly unoccupied zone becomes reoccupied, the target temperature of that zone may revert back to the last temperature it was previously at prior to the occupant leaving the zone. For example, the target temperature of the reoccupied zone may revert back to the value determined at step 114.

In another aspect of the present invention, there is provided a control unit that may be operated as part of the above-described methods. In particular, the control unit may receive data indicative of the occupancy of one or more zones of the vehicle, receive data indicative of a target temperature of each of the occupied zones, receive data indicative of the occupancy of the previously occupied zones (i.e. receive data indicative of when one or more of the occupied zones becomes unoccupied), and provide instructions to adjust the target temperature of one or more of the newly unoccupied zones to the adjusted target temperature. The control unit may only operate when a sync function is actuated.

Figure 3A:
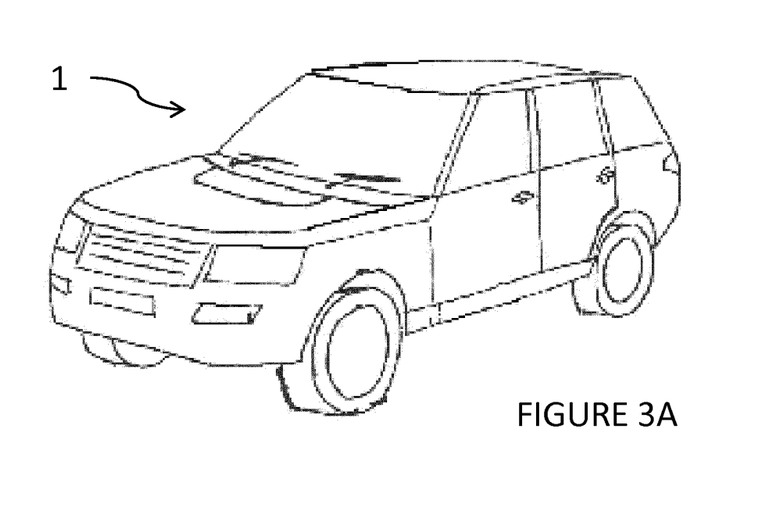
FIG. 3A shows a vehicle in accordance with an embodiment of the present invention.

FIG. 3A shows a vehicle 1 that may include the above-described control unit, or indeed any other means for executing the above-described methods, in accordance with embodiments of the present invention.

Figure 3B:
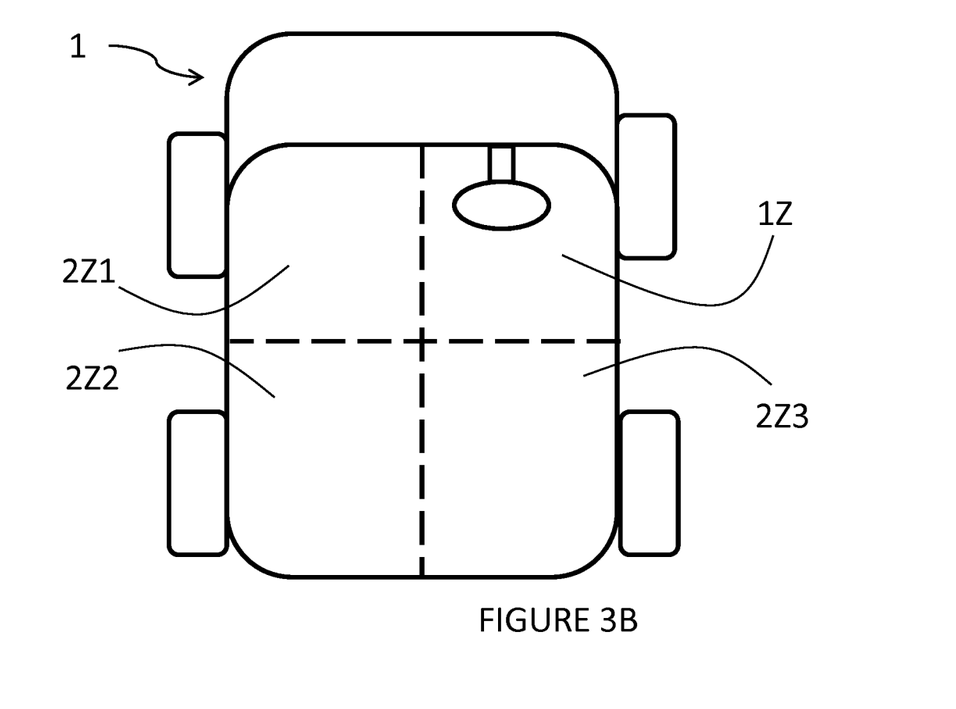
FIG. 3B shows a schematic top down view of the vehicle of FIG. 3A with various zones of the vehicle indicated.

In one example, the vehicle 100 includes a primary zone, 1Z, that is initially occupied by a driver, and three secondary zones 2Z1, 2Z2, 2Z3, that are each initially occupied by a passenger. FIG. 3B shows a schematic top down view of the vehicle 1 of FIG. 3 where each of the zones 1Z, 2Z1, 2Z2, 2Z3 is indicated. Table 1 below shows the initial target temperatures of each of the zones, 1Z, 2Z1, 2Z2, 2Z3, as set by the respective occupants in accordance with the example.

TABLE 1

|  | Zone | | | |
|---|---|---|---|---|
|  | 1Z | 2Z1 | 2Z2 | 2Z3 |
| Target Temperature (° C.) - initial | 22 | 23 | 18 | 16 |

When the passengers occupying zones 2Z2 and 2Z3 leave their respective zones (e.g. leave the vehicle 100), the target temperature of each of zones 2Z2 and 2Z3 is accordingly adjusted to the adjusted target temperature, TT. In this example, the adjusted target temperature, TT, equals the target temperature of the primary zone, 1Z, i.e. TT=22° C. Table 2 shows the target temperatures of each of the zones, 1Z, 2Z1, 2Z2, 2Z3, following adjustment.

TABLE 2

|  | Zone | | | |
|---|---|---|---|---|
|  | 1Z | 2Z1 | 2Z2 | 2Z3 |
| Target Temperature (° C.) - after adjustment | 22 | 23 | 22 | 22 |

Since zone 2Z1 remains occupied, its target temperature is not adjusted.

Figure 4:
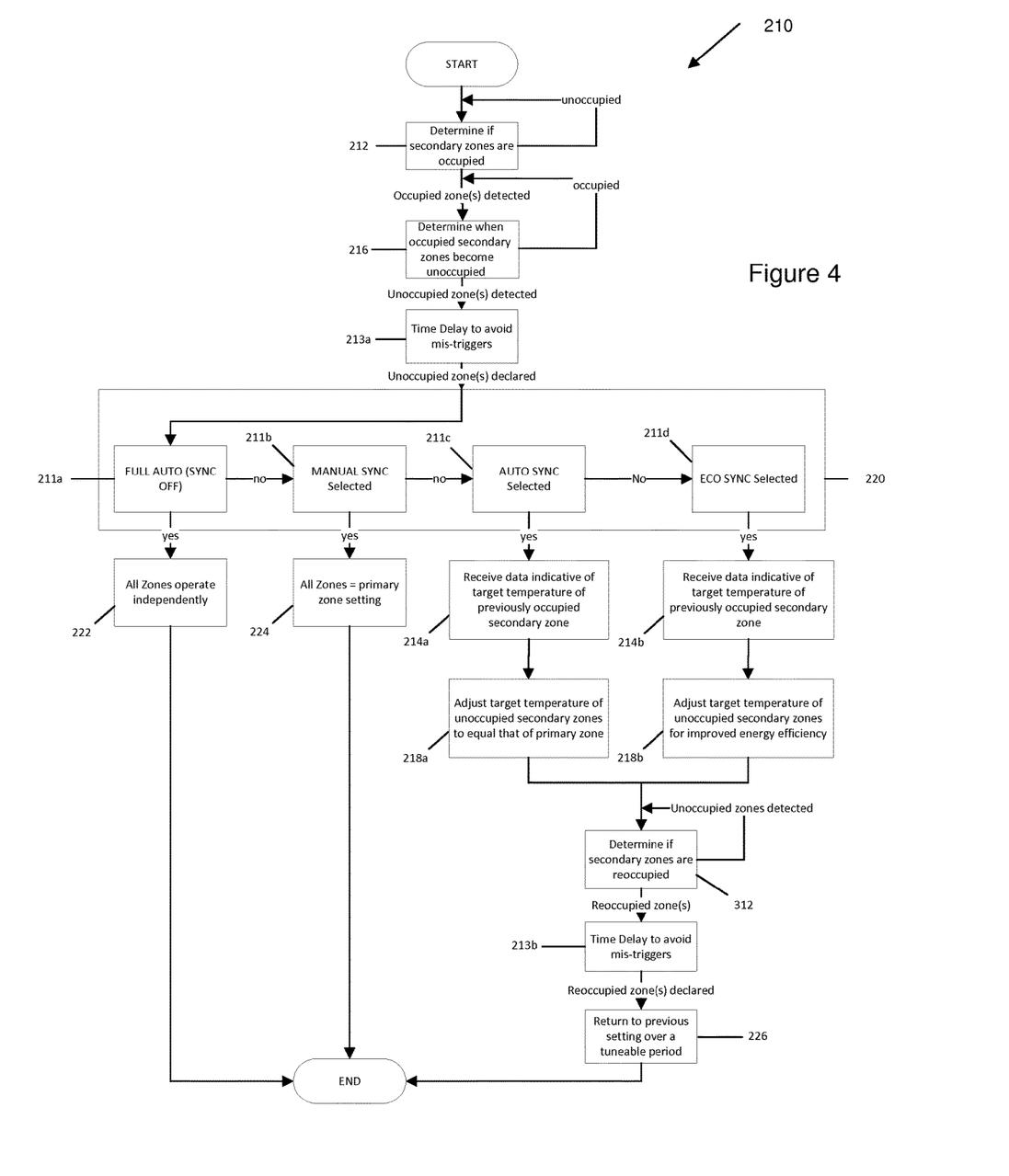
FIG. 4 shows a method according to an alternative embodiment of the present invention.

A method 210 according to a further embodiment of the invention is depicted in FIG. 4. All features shown in and described in relation to FIG. 4 that are in addition to those described above in relation to FIGS. 1 and 2 may be incorporated individually or collectively into alternative embodiments of the present invention.

As shown in FIG. 4, a determination is made at step 212 as to whether or not any of the secondary zones are occupied. If secondary zones are initially found to be unoccupied, then step 212 is repeated. If secondary zones are found to be occupied at step 212, a determination is made at step 216 as to whether any of the occupied secondary zones has become unoccupied. If secondary zones are found to be unoccupied at step 216, a time period is permitted to elapse at step 213a before verifying that the detected unoccupied secondary zone is, in fact, unoccupied. The use of a time delay serves to avoid "mis-triggers" i.e. false results which may arise from an occupant moving within their respective secondary zone. Additionally or alternatively, vehicle door opening status may be monitored and used as indicative that an occupant seated adjacent a door, which is subsequently detected as having been opened, has left the vehicle. This approach may advantageously help to reduce the occurrence of unwanted temperature adjustment based on transient occupied/unoccupied zone signals, which can be created if an occupant shifts their seating position regularly whilst remaining in a given zone.

In the example of FIG. 4, one of four states may be selected by a user from an interface 20. The four states are "FULL-AUTO (SYNC-OFF)", "MANUAL-SYNC", "AUTO-SYNC", and "ECO-SYNC". At step 211a, a determination is made as to whether or not FULL-AUTO state is selected. If FULL-AUTO is determined to be selected, all zones (i.e. primary and secondary zones) operate independently at step 222, with their respective target temperatures being determined by a control for each zone. If FULL-AUTO is determined to not be selected, a determination is made at step 211b as to whether or not MANUAL-SYNC is selected. If MANUAL-SYNC is determined to be selected, the target temperature of each secondary zone (whether occupied or not) is adjusted at step 224 to equal that of the primary zone. If MANUAL-SYNC is determined not to be selected, a determination is made at step 211c as to whether or not AUTO-SYNC is selected. If AUTO-SYNC is determined to be selected then data is received at step 214a that is indicative of the target temperature of the previously occupied secondary zone (i.e. the previous setting is memorized) and the target temperature of the unoccupied secondary zones is adjusted at step 218a to equal that of the primary zone. This adjustment may be performed over a tuneable time period to avoid sudden changes in temperature or system noise. If AUTO-SYNC is determined to not be selected, a determination is made at step 211d as to whether or not ECO-SYNC is selected. Since one of the four states 211a, 211b, 211c, 211d must be selected, if none of FULL-AUTO, MANUAL-SYNC, or AUTO-SYNC is selected, ECO-SYNC must be selected. If ECO-SYNC is determined to be selected, then data is received at step 214b that is indicative of the target temperature of the previously occupied secondary zone (i.e. the previous setting is memorized) and the target temperature of the unoccupied secondary zones is adjusted at step 218b to improve or optimize energy efficiency of the system. This adjustment may be performed over a tuneable time period to avoid sudden changes in temperature or system noise.

Following either of steps 218a or 218b, a determination is made at step 312 as to whether or not any of the unoccupied secondary zones have become reoccupied. If reoccupied secondary zones are detected, a time period is allowed to elapse at 213b before verifying that the detected reoccupied secondary zone is, in fact, reoccupied. As with the time delay introduced at step 213a, the time delay at step 213b serves to avoid "mis-triggers". Once it has been verified that a secondary zone has been reoccupied, the target temperature may be adjusted to equal the previous setting as determined at step 214*a* or 214*b*. This adjustment may be performed over a tuneable time period 226 to avoid sudden changes in temperature or system noise.

Certain embodiments of the present invention provide a method and means for automatically adjusting the target temperature of a zone of a vehicle when the occupant of that zone leaves the zone (e.g. moves to another zone within the vehicle or leaves the vehicle altogether). There is therefore no reliance on the driver of the vehicle to take action when a zone has become unoccupied and left at a particular target temperature. Further, there is no reliance on the driver to manually synchronize the other zones of the vehicle. Embodiments of the present invention may therefore reduce required driver interaction with the climate system. Certain embodiments of the present invention may improve energy efficiency of the vehicle by avoiding unnecessary heating or cooling of unoccupied zones.

It will be appreciated that embodiments of the present invention can be realized in the form of hardware, software or a combination of hardware and software. Any such software may be stored in the form of volatile or non-volatile storage such as, for example, a storage device like a ROM, whether erasable or rewritable or not, or in the form of memory such as, for example, RAM, memory chips, device or integrated circuits or on an optically or magnetically readable medium such as, for example, a CD, DVD, magnetic disk or magnetic tape. It will be appreciated that the storage devices and storage media are embodiments of machine-readable storage that are suitable for storing a program or programs that, when executed, implement embodiments of the present invention. Accordingly, embodiments provide a program comprising code for implementing a system or method as claimed in any preceding claim and a machine readable storage storing such a program. Still further, embodiments of the present invention may be conveyed electronically via any medium such as a communication signal carried over a wired or wireless connection and embodiments suitably encompass the same.

All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings), may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of any foregoing embodiments. The invention extends to any novel one, or any novel combination, of the features disclosed in this specification (including any accompanying claims, abstract and drawings), or to any novel one, or any novel combination, of the steps of any method or process so disclosed. The claims should not be construed to cover merely the foregoing embodiments, but also any embodiments which fall within the scope of the claims.

The invention claimed is:

1. A method of controlling a vehicle climate system having a plurality of zones wherein the plurality of zones includes a primary zone for a driver of a vehicle and one or more secondary zones for one or more passengers of the vehicle, the method comprising:

determining that one or more of the one or more secondary zones is occupied by a person;
receiving data indicative of a target temperature of the primary zone;
determining when at least one of the one or more occupied secondary zones becomes unoccupied;
determining an enabled synchronize function;
determining an adjusted target temperature for the at least one unoccupied secondary zone based on the enabled synchronize function; and
adjusting a target temperature of the at least one unoccupied secondary zone to the adjusted target temperature, wherein the adjusted target temperature is a function of the target temperature in the primary zone, wherein the adjusted target temperature is either equal to the target temperature in the primary zone plus or minus a predetermined constant or equal to the target temperature in the primary zone multiplied by a predetermined factor.

2. The method of claim 1, wherein the adjusted target temperature is lower than the target temperature in the primary zone when the primary zone is being heated by the climate system.

3. The method of claim 1, wherein the adjusted target temperature is higher than the target temperature in the primary zone when the primary zone is being cooled by the climate system.

4. The method of claim 1, wherein the adjusted target temperature is dependent on a temperature outside of the vehicle.

5. The method of claim 1, wherein determining when the at least one of the one or more occupied secondary zones becomes unoccupied comprises using a sensor for detecting the presence of a person.

6. The method of claim 1, wherein a first adjusted target temperature is determined when a first auto-synchronize function is enabled and a second adjusted target temperature is determined when a second auto-synchronize function is enabled, the second adjusted target temperature being arranged to achieve improved energy efficiency performance of the vehicle.

7. The method of claim 1, wherein when it is determined that the at least one of the one or more occupied secondary zones has become unoccupied, a time period is permitted to elapse before verifying that the at least one detected unoccupied secondary zone is unoccupied.

8. The method of claim 1, wherein adjusting the target temperature of the at least one unoccupied secondary zone to the adjusted target temperature is performed over a time period.

9. The method of claim 1, wherein determining the enabled synchronize function comprises determining the enabled synchronize function in response to the determination that the at least one of the one or more occupied secondary zones has become unoccupied.

10. A control unit for controlling a vehicle climate system having a plurality of zones, wherein the plurality of zones includes a primary zone for a driver of a vehicle and one or more secondary zones for one or more passengers of the vehicle, the control unit comprising one or more electronic processors configured to:

receive data indicative of the occupancy of one or more of the one or more secondary zones;
receive data indicative of a target temperature of the primary zone;
receive data indicative of when at least one of the one or more occupied secondary zones becomes unoccupied;

determine an enabled synchronize function;
determine an adjusted target temperature for the at least one unoccupied secondary zone based on the enabled synchronize function; and
adjust a target temperature of the at least one unoccupied secondary zone to the adjusted target temperature,
wherein the adjusted target temperature is a function of the target temperature in the primary zone, wherein the adjusted target temperature is either equal to the target temperature in the primary zone plus or minus a predetermined constant or equal to the target temperature in the primary zone multiplied by a predetermined factor.

11. A vehicle climate system having the plurality of zones and including the control unit of claim 10.

12. A vehicle including the vehicle climate system according to claim 11.

13. The control unit of claim 10, wherein the one or more electronic processors is configured to determine the enabled synchronize function in response to the receipt of data indicative of the at least one of the one or more occupied secondary zones having become unoccupied.

14. A control unit for controlling a vehicle climate system having a plurality of zones, wherein the plurality of zones includes a primary zone for a driver of a vehicle and one or more secondary zones for one or more passengers of the vehicle, the control unit comprising one or more electronic processors configured to:
    determine that one or more of the one or more secondary zones is occupied by a person;
    receive data indicative of a target temperature of the primary zone;
    determine when at least one of the one or more occupied secondary zones becomes unoccupied;
    determine an enabled synchronize function;
    determine an adjusted target temperature for the at least one unoccupied secondary zone based on the enabled synchronize function; and
    adjust a target temperature of the at least one unoccupied secondary zone to the adjusted target temperature,
    wherein the adjusted target temperature is a function of the target temperature in the primary zone, wherein the adjusted target temperature is either equal to the target temperature in the primary zone plus or minus a predetermined constant or equal to the target temperature multiplied by a predetermined factor.

15. The control unit of claim 14, wherein the one or more electronic processors is configured to determine the enabled synchronize function in response to the determination that the at least one of the one or more occupied secondary zones has become unoccupied.

* * * * *